United States Patent [19]

Springer

[11] Patent Number: 5,323,503
[45] Date of Patent: Jun. 28, 1994

[54] LIP EXTENSION AND CONTROL DEVICE FOR DOCK LEVELERS

[75] Inventor: Scott Springer, Milwaukee, Wis.

[73] Assignee: Rite-Hite Corporation, Milwaukee, Wis.

[21] Appl. No.: 972,192

[22] Filed: Nov. 5, 1992

[51] Int. Cl.$^5$ ............................................. E01D 1/00
[52] U.S. Cl. .................................... 14/71.3; 14/71.1
[58] Field of Search .................. 14/69.5, 70, 71.1, 71.3, 14/71.5, 71.7, 72.5

[56] References Cited

U.S. PATENT DOCUMENTS

| | | | |
|---|---|---|---|
| Re. 30,104 | 10/1979 | Burnham | 14/71.3 |
| 3,117,332 | 1/1964 | Kelley et al. | 14/71.3 |
| 3,235,896 | 2/1966 | Riggs | 14/71.3 |
| 3,249,956 | 5/1966 | Zajac et al. | 14/71.3 |
| 3,271,801 | 9/1966 | Dieter et al. | 14/71.3 |
| 3,323,158 | 6/1967 | Loomis . | |
| 3,327,335 | 6/1967 | Beckwith et al. . | |
| 3,409,922 | 11/1968 | Beckwith et al. . | |
| 3,411,168 | 11/1968 | Hecker, Jr. . | |
| 3,426,377 | 2/1969 | Beckwith et al. . | |
| 3,444,574 | 5/1969 | Clear | 14/71.3 |
| 3,460,175 | 8/1969 | Beckwith et al. . | |
| 3,486,181 | 12/1969 | Hecker, Jr. et al. . | |
| 3,497,893 | 3/1970 | Beckwith et al. . | |
| 3,516,103 | 6/1970 | Hecker, Jr. et al. . | |
| 3,530,488 | 9/1970 | Beckwith . | |
| 3,553,756 | 1/1971 | Hecker, Jr. et al. . | |
| 3,579,696 | 5/1971 | Hecker, Jr. et al. . | |
| 3,583,014 | 6/1971 | Brown et al. . | |
| 3,662,416 | 5/1972 | Brooks et al. | 14/71.3 |
| 3,685,076 | 8/1972 | Loblick | 14/71.7 |
| 3,699,601 | 10/1972 | Hecker, Jr. et al. . | |
| 3,728,753 | 4/1973 | Beckwith et al. . | |
| 3,763,514 | 10/1973 | Bishop | 14/71.3 |
| 3,786,530 | 1/1974 | Le Clear | 14/71.3 |
| 3,835,497 | 9/1974 | Smith | 14/71.3 |
| 3,967,337 | 7/1976 | Artzberger | 14/71.7 X |
| 4,065,824 | 1/1978 | Ellis et al. | 14/71.3 |
| 4,110,960 | 9/1978 | Neff et al. . | |
| 4,257,137 | 3/1981 | Hipp et al. . | |
| 4,364,137 | 12/1982 | Hahn | 14/71.3 |
| 4,402,100 | 9/1983 | Slusar | 14/71.3 |
| 4,531,248 | 7/1985 | Swessel et al. . | |
| 4,570,277 | 2/1986 | Hahn et al. . | |
| 4,776,052 | 10/1988 | Delgado et al. | 14/71.3 |
| 4,819,770 | 4/1989 | Hahn . | |
| 4,823,421 | 4/1989 | Kleynjans et al. | 14/71.3 |
| 4,865,507 | 9/1989 | Trickle . | |
| 4,920,598 | 5/1990 | Hahn . | |
| 4,937,906 | 7/1990 | Alexander | 14/71.1 |
| 4,995,130 | 2/1991 | Hahn et al. . | |
| 5,040,258 | 8/1991 | Hahn et al. . | |
| 5,088,143 | 2/1992 | Alexander | 14/69.5 |

FOREIGN PATENT DOCUMENTS

| | | | |
|---|---|---|---|
| 130393 | 1/1985 | European Pat. Off. | 14/71.1 |
| 1349801 | 4/1974 | United Kingdom | 14/71.3 |

Primary Examiner—Ramon S. Britts
Assistant Examiner—James A. Lisehora
Attorney, Agent, or Firm—Leydig, Voit & Mayer, Ltd.

[57] ABSTRACT

An improved lip extension and control assembly is provided for use in a dock leveler. The dock leveler has a ramp pivotally connected to a stationary frame in a conventional manner for pivoting between a pendant, stored position and an extended preparatory position. The lip is pivotally connected to the front edge of the ramp. The assembly has an extension assembly operatively connected to the lip for extending the lip in response to the rotation of the ramp to the extended position. A pivot controlling assembly operatively connected to the lip controls the rotation of the lip in a programmed manner such that upon walking the deck down, the descent of the lip progressively increases from the extended position to the pendant position.

73 Claims, 4 Drawing Sheets

LIP EXTENSION AND CONTROL DEVICE FOR DOCK LEVELERS

FIELD OF THE INVENTION

The present invention relates generally to dock levelers and more particularly to dock levelers having lip extension and control devices.

BACKGROUND OF THE INVENTION

Dock levelers are utilized to compensate for height differences between the dock platform and the bed of a parked vehicle to permit forklift trucks and personnel to readily move on and off the vehicle during loading and unloading operations. A typical dock leveler has a dockboard or deck pivotally hinged at its back edge for varying the height of the dock leveler in order to compensate for the height differences. An extension plate or lip is typically hinged to the front edge of the deck for spanning the distance between the rear end of the vehicle bed and the outer front edge of the deck. The lip is adapted to move relative to the deck front edge between a pendant stored position, an extended preparatory position, and a lowered operative position. In its operative position, the lip extends from the deck front edge and may be substantially coplanar with the upper surface of the deck. The lip rests upon and is supported by the upper surface of the bed of the parked vehicle. Thus the extended lip spans the gap which is formed between the rear edge of the vehicle bed and the front edge of the deck.

To move the lip from the pendant stored position to an extended operative position, the deck is normally pivoted upwardly a sufficient amount whereby the lip can swing outwardly to the extended preparatory position without obstruction from the parked vehicle. Once the lip has cleared the parked vehicle, the deck and extended lip are pivoted downwardly as a unit until the extended lip rests upon the vehicle bed in the operative position. After loading or unloading of the parked vehicle has been completed, the vehicle is moved away from the dock permitting the lip to be cycled to assume its pendant stored position.

In some conventional dock leveler assemblies, heretofore, a safety hazard may be created when the dock leveler was activated without a vehicle in position or when the vehicle moved away from the dock after completion of the loading or unloading operation because the lip of the assembly remained in an extended outwardly projecting position with respect to the dock platform. In such a situation, if the operator failed to take the necessary steps to return the dock leveler and lip to their stored position, the extended outwardly projecting lip was very susceptible to being struck or damaged by the next vehicle backing towards the dock for loading or unloading. Thus, to avoid such a situation, it required a conscious action on the part of the dock personnel as well as alertness on the part of the vehicle driver.

Attempts to provide a lip which would automatically assume the pendant stored position without conscious action by the dock personnel have not been fully satisfactory. Many conventional dock levelers have required a relatively large deck lift spring biasing force to extend the lip thus requiring a large force to walk down the ramp to the truck bed. Some of the typical dock leveler assemblies which have utilized gravity to move the lip from the extended position to the fully pendant position have been unable to move the lip the necessary amount after the lip has pivoted through the first portion of its downward travel due to insufficient gravitational force. Other difficulties have resulted from the premature pivotal movement of the lip from its extended position before it is brought into supporting engagement with the bed of the parked vehicle. Other devices have been highly susceptible to malfunction or are difficult and awkward to install and maintain in proper working order.

OBJECTS AND SUMMARY OF THE INVENTION

It is an object of the present invention to provide a lip extension and control assembly which is not beset with any of the aforementioned shortcomings.

It is an object to provide an improved lip extension and control assembly which does not rely on a conscious act on the part of an operator to cause the unit to assume a stored pendant position.

It is another object to provide an extension device which will automatically control the rate of relative movement between the lip and the dockboard in a programmed manner.

It is a related object to provide a lip extension and control assembly which can controllably adjust the speed of the lip descent so that the lip descends slowly near the extended position and more quickly near the pendant position.

Another object is to provide a lip extension and control assembly which allows the lip to yield without damage in the event of impact while the lip is in the extended position, yet will hold the lip extended in the preparatory position until the operator walks the ramp down to the truck bed.

Yet another object is to provide a lip extension and control assembly which is easily adjustable and operable with various different lip sizes and hinge friction.

A related object is to provide a device in which the force for extending the lip relative to the lip fall characteristics can be independently adjusted.

It is a more specific object to provide a device which requires lower deck pivotal force to extend the lip, allowing a lighter person to walk the leveler to the truck bed.

It is a further object to provide a device which is of simple, sturdy and compact construction and is easy and inexpensive to install and maintain.

It is a further object to provide a lip extension and control assembly which may readily be installed on existing dock levelers which vary over a wide range in size and shape.

In accordance with one embodiment of the invention, an improved lip extension and control assembly is provided for use in a dock leveler. The dock leveler has a ramp pivotally connected to a stationary frame in a conventional manner for pivoting between a horizontal stored position, an extended preparatory position, and a lowered operative position. The lip is hingedly connected to the front edge of the ramp. The assembly has a three-ended crank pivotally attached to the underside of the ramp and operatively connected to the lip. An extending means operatively connected to the lip for extending the lip in response to the rotation of the ramp comprises a snubbing cable fixedly anchored to the frame and the first crank end. When the lifting means raises the ramp, the cable rotates the crank and extends the lip. A pivot controlling means operatively connected to the lip controls the rotation of the lip in a programmed manner. The pivot controlling means comprises a crank and biasing means which (1) permits slow rotation of the lip during the first portion of the lip descent so that the operator can lower the ramp and extended lip to engage the bed of a vehicle, (2) progressively increases the rate of rotation of the lip during the latter portion of the lip descent so that the dock leveler can be stored more quickly and receive the next vehicle, and (3) assists the lip extension.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
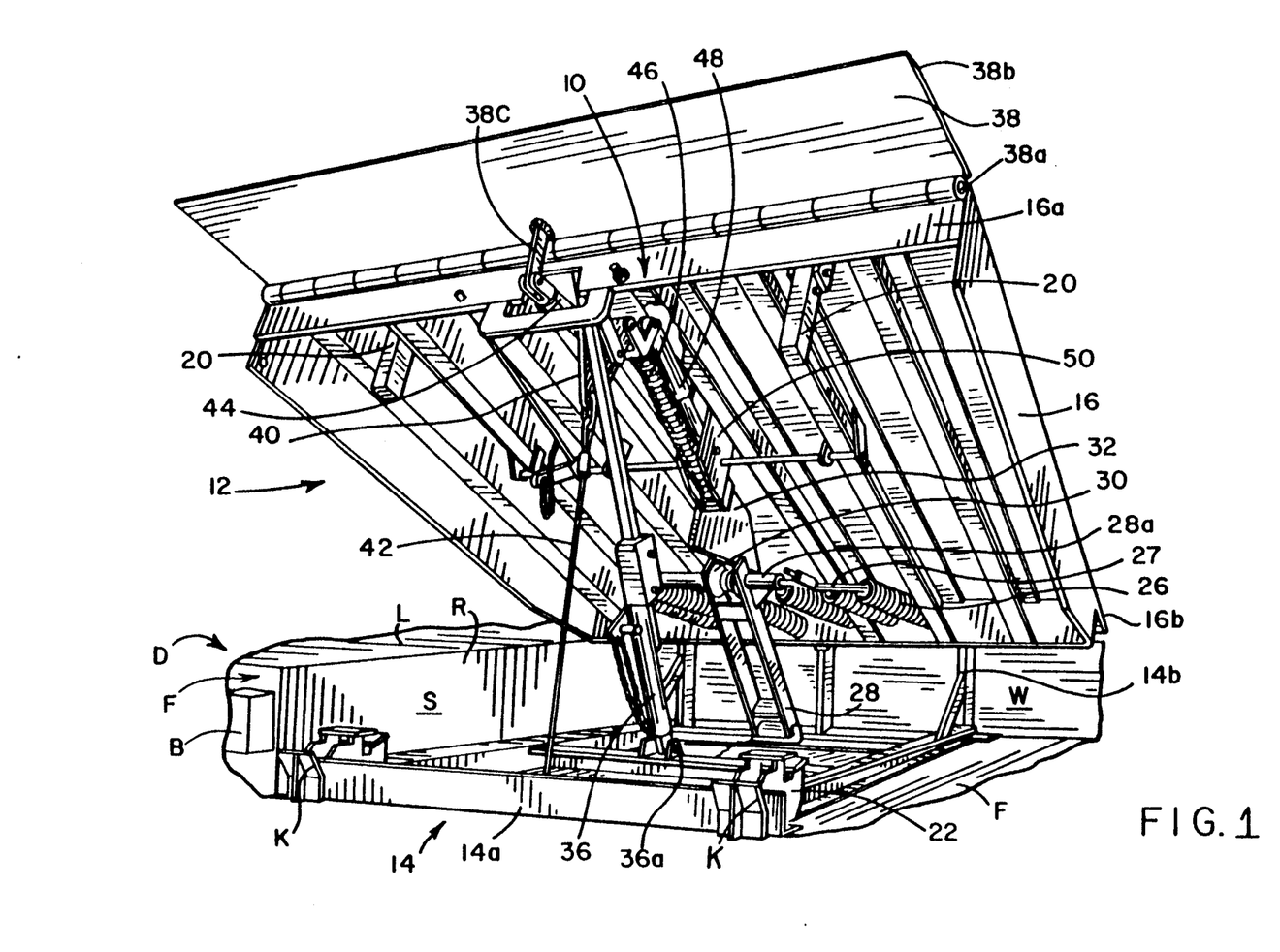
FIG. 1 is a perspective view of a dock leveler and a lip extension and control assembly in accordance with the invention.

Referring to the drawings and more particularly to FIG. 1, a lip extension and control assembly 10 made in accordance with the present invention is shown mounted in a dock leveler assembly 12 and a conventional loading dock D.

The conventional loading dock D has a loading surface L and a recess or pit R defined by a floor F and upstanding side and rear walls S and W, respectively. Mounted on the dock front wall F and adjacent to, but spaced from, the pit side walls S are conventional bumpers B which are engaged by the rear of the vehicle when the vehicle is backed into a parked position relative to the dock leveler assembly 12. The bumpers B prevent the vehicle from striking and damaging the dock wall F and the various components of the dock leveler assembly 12.

Figure 2:
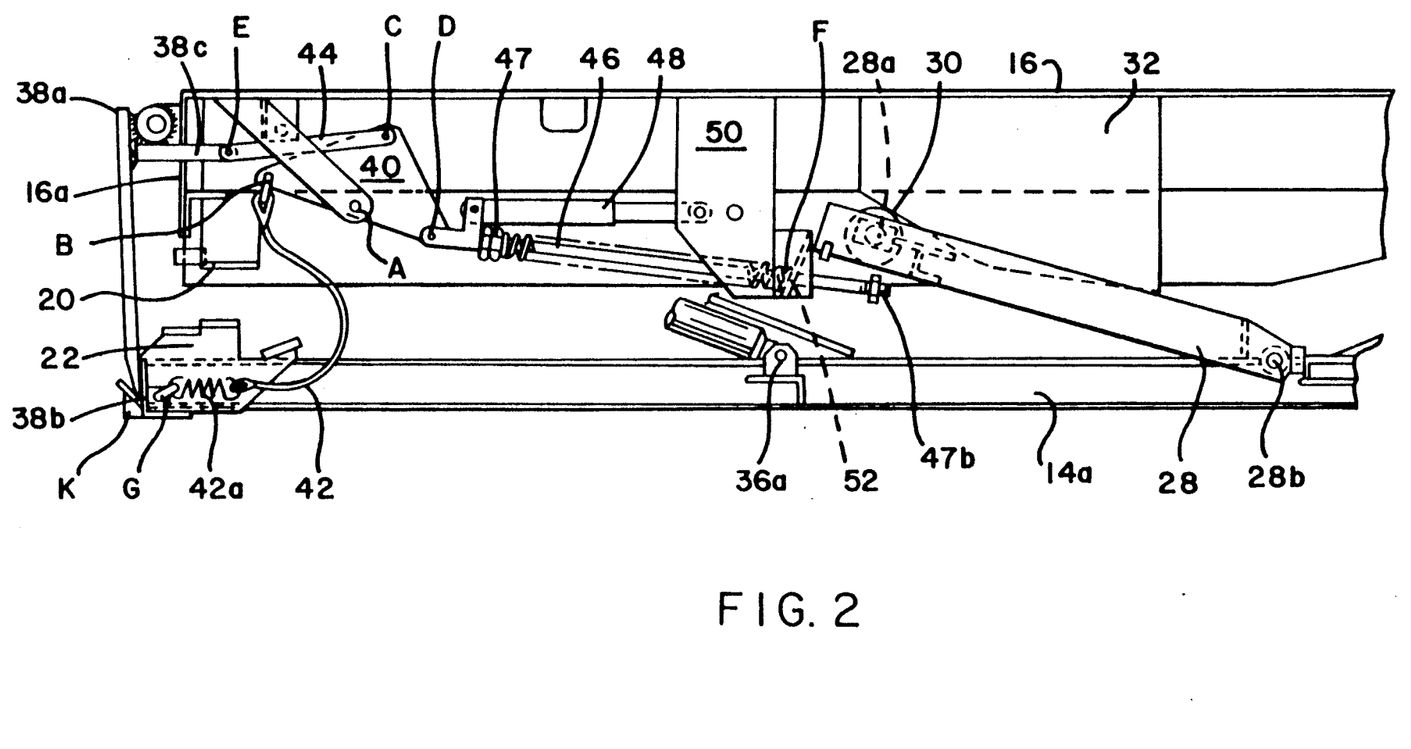
FIG. 2 is a cross sectional view illustrating the dock leveler and the lip extension and control assembly in the pendant stored position.

The dock leveler assembly 12 is adapted to span the distance between the dock D and the bed of the vehicle (not shown). The dock leveler assembly 12 includes a frame 14 having a floor section 14a mounted to the floor F of the recess R and a rear section 14b projecting upwardly from the rear of the floor section 14a. A ramp or deck 16 is pivotally hinged to the rear section 14b so that the ramp 16 can pivot between a first pendant, stored position shown in FIG. 2, a second extended, preparatory position shown in FIG. 3, and an operative position, similar to FIG. 2 but with the lip extended. A lip or extension plate 38 is hingedly connected to the front edge portion 16a of the ramp 16. The ramp 16 is configured so that it will overlie and enclose the open top of the recess R and be substantially flush with the dock D when the ramp 16 is not in use as shown in FIG. 2. A pair of safety legs 20 depending from the underside of the ramp 16 are adapted to engage upwardly extending stops 22 provided on the floor section 14a in the event that the ramp 16 should inadvertently fall. The stops 22 are retractable for below dock operation.

Figure 3:
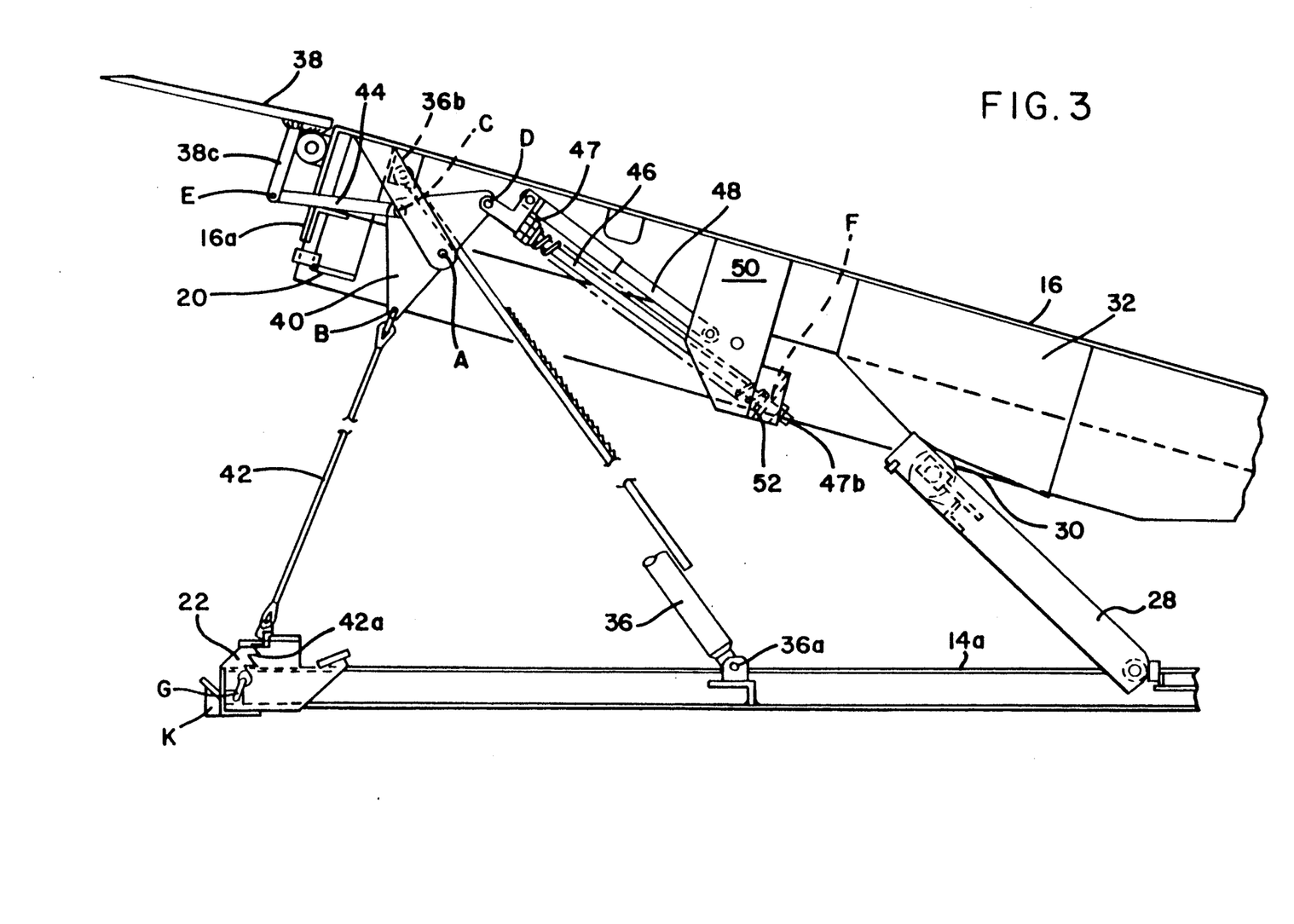
FIG. 3 is a cross sectional view illustrating the dock leveler and the lip extension and control assembly in the fully extended preparatory position.

Means for lifting the ramp 16 from the stored position shown in FIG. 2 to the preparatory position in FIG. 3 are conventional and well known. In the illustrated embodiment, the lifting means comprises a plurality of heavy duty tension springs 26 which bias the ramp 16 to pivot upwardly about the rear edge 16b. Each spring 26 has one end connected to the underside of the ramp 16 adjacent to the rear edge portion 16b thereof. The other end of the spring 26 is connected to the crossbar 27 which is secured to the free end 28a of a follower arm 28 which has the anchor end 28b thereof pivotally connected to floor section 14a. The free end 28a of arm 28 is provided with a roller 30 which engages a cam plate 32 attached to the underside of ramp 16. To control the pivoting of the ramp 16 from its horizontal inoperative position shown in FIG. 1, a conventional ramp holding unit 36 is provided. One end 36a of the holding unit 36 is pivotally connected to the underside of the ramp 16 and the opposite end 36b of the holding unit 36 is pivotally connected to the floor section 14a. A typical ramp holding unit 36 is described in U.S. Pat. No. 4,531,248 issued to Swessel et al. which is hereby incorporated herein. In another embodiment (not shown), the lifting means may comprise a conventional hydraulic lift which raises and lowers the ramp 16; also is well known in the art.

The lip or extension plate 38 has a first end 38a hingedly connected to a ramp header 16a in a conventional manner and a second end 38b which is adapted to engage the bed of a vehicle and the like. The lip 38 is movable between a pendant stored position shown in FIG. 2 and an extended preparatory position shown in FIG. 3. From the extended preparatory position, the lip 38 can descend upon moving the deck to the operative position and is adapted to span the gap which exists between the front of the loading dock D and the bed of the parked vehicle to be unloaded or loaded. The lip 38 allows a forklift truck and dock personnel to readily move between the ramp 16 and the bed of the vehicle. The length of the lip 38 substantially spans the distance between the bumpers B and is preferably formed of tread plate steel and thus capable of withstanding substantial loads. To guard against the inadvertent swinging of the lip 38 in a clockwise direction from the stored position of FIG. 2, the keepers K adjacent the front wall F are provided for receiving and holding the free end 38b of the lip 38 against wall F. The width of the lip 38 is adapted so the lip 38 supports the ramp 16 in a generally horizontal stored position when the free end 38b is supported by the keepers K.

When the ramp 16 is to be activated for loading or unloading a vehicle parked adjacent the front wall F of the dock D, the biasing forces of the springs 26 raise the ramp 16 to its full upwardly pivoted preparatory position as shown in FIGS. 1 and 3 whereupon the lip 38 will automatically assume its extended position as described hereinafter. Once this has occurred, the operating dock personnel will normally walk outwardly onto the ramp 16 thereby overcoming the bias of springs 26 and causing the ramp 16 and the extended lip 38 to pivot downwardly until the extended lip 38 engages the top of the bed of the parked vehicle in the operative position.

In accordance with one of the objects of the invention, the lip extension and control assembly 10 comprises extending means operatively connected to the lip 38 for automatically extending the lip 38 in response to the movement of the ramp 16 with a low extension force requirement from the pendant, stored position to the extended, preparatory position, and pivot controlling means operatively connected to the lip 38 for automatically controlling the rate of pivotal movement of the lip 38 in a programmed manner. It is preferable that upon walking the deck down the pivot controlling means effects a relatively slow descent during the first portion of the downward movement of the lip 38 to provide sufficient time for the dock operator to walk the ramp 16 and the extended lip 38 down to engage the vehicle bed. Heretofore, many conventional dock levelers and lip assemblies would prematurely rotate the lip 38 to the pendant position before the ramp 16 could be lowered to the bed of the vehicle. Similarly, after the vehicle has left the dock D, the pivot controlling means preferably effects a relatively rapid descent of the lip 38 during the last portion of the downward movement of the lip 38 so that the lip 38 quickly returns to the pendant position in order to be stored behind keepers K or receive the next vehicle.

In the illustrated embodiment, the lip extension and control assembly 10 comprises a three-ended bell crank 40 pivotally connected to the underside of the ramp 16 at pin A, a lip arm 38c disposed intermediate the first and second ends 38a, 38b of the lip 38, a snubbing cable 42 connecting the first crank end 40b pivot at point B and the floor section 14a at point G, a lip connecting link 44 pivotally connecting the second crank end 40c at point C and the lip arm 38c at point E, and a biasing means pivotally connecting the third crank end 38D at point D and a ramp plate 50. The biasing means comprises assist spring 46 slidably mounted between the inclined plate 52 and adjustment nut 47 which selectively adjusts the force in the spring 46 and damper 48 which is adapted so that a small rotation of the extended lip 38 requires a long compression stroke, resulting in a slow descent during the first portion of the lip downward movement. The snubbing cable 42 is operatively connected to the lip 38 by lip connecting link 44 and crank 40 so that the lip 38 is extended in response to the extension of the snubbing cable 42 by the ramp 16 as shown in FIG. 3. The biasing means is operatively connected to the lip 38 by lip connecting link 444 and crank 40 for exerting a biasing force on the lip 38 in a programmed manner to be described.

Figures 4, 5:
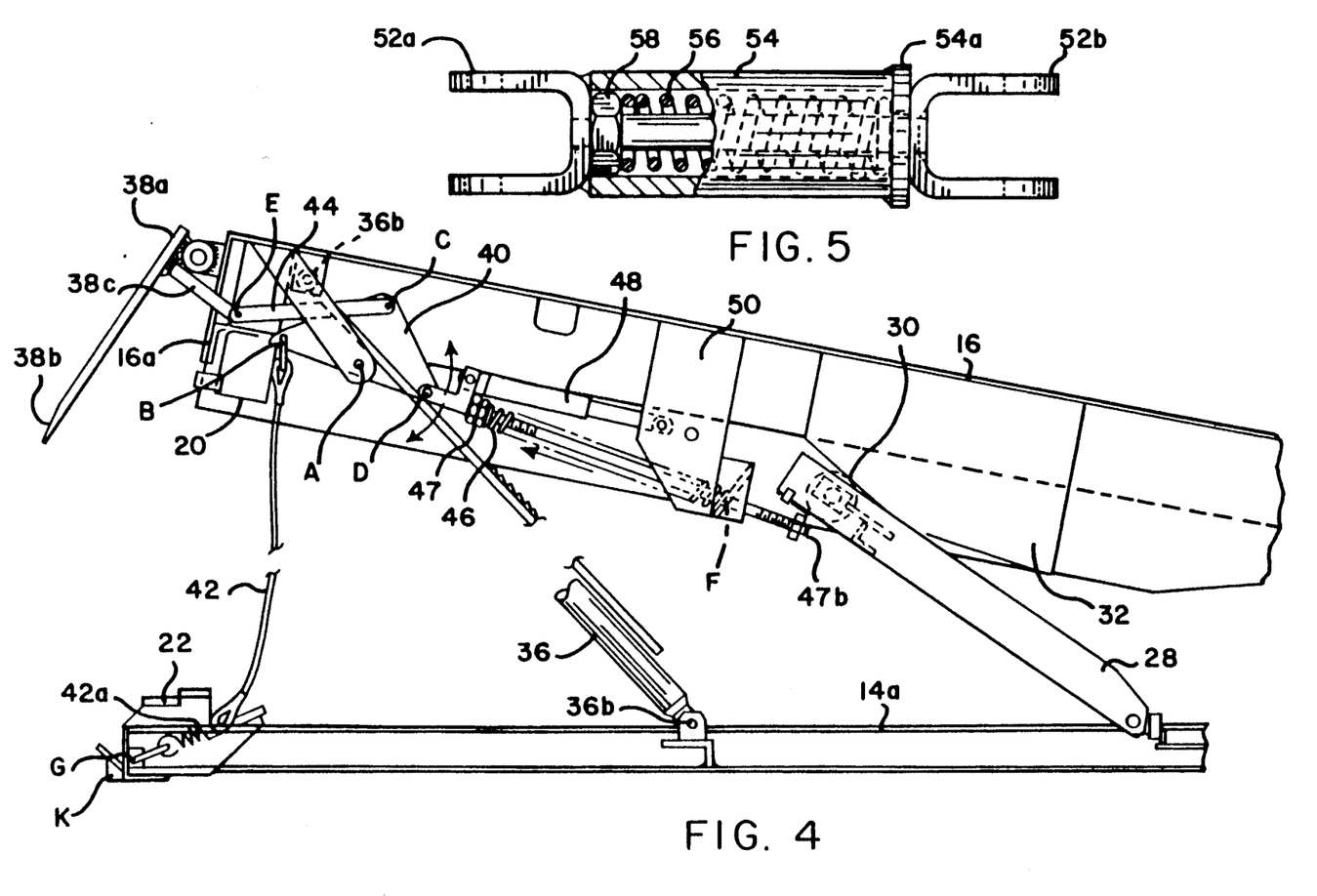
FIG. 4 is a cross sectional view illustrating the dock leveler and the lip extension and control assembly in a transitional position intermediate the fully extended preparatory and the pendant stored positions.
FIG. 5 is an enlarged view of the link connecting the lip and the crank.

It will be appreciated that the forces and torques exerted on the crank 40 created by the lip 38 and the biasing means varies between the pendant position shown in FIG. 2 and the extended preparatory position shown in FIG. 3. The biasing force created by the biasing means will pass through an intermediate center point disposed intermediate the pendant and extended positions in which the biasing force is along the straight line ADF as generally illustrated in FIG. 4. When the biasing force is over-center above the intermediate point, the biasing means will exert a counterclockwise torque on the crank 40 whereas, over-center below the intermediate point, the biasing means exerts a clockwise torque on the crank 40. In the pendant position the spring 46 is compressed, creating a clockwise torque on the crank 40. The biasing force exerted by the spring 46 on the crank 40 retains the lip in the pendant position. In the extended position, the spring 46 is also compressed so that the spring biasing force exerts a counterclockwise torque on the crank 40. Similarly, the crank 40 freely extends the damper 48 which creates dynamic resistance on the crank 40 only when the lip 38 rotates in the counterclockwise direction. Referring to FIG. 3, it will be appreciated that the crank 40 exerts maximum compression on the spring 46 when the points A, D, and F are in line with each other (line AF). However, the magnitude of the torque generated by the biasing means exerted on the crank 40 will be minimized because the moment arm created by the biasing means is substantially in line with the crank arm AD.

In the operation of the dock leveler thus far described, the lifting means raises the ramp 16 from the stored position shown in FIG. 2 to the preparatory position shown in FIG. 3 by the lifting means. As the ramp 16 is raised upwardly, the snubbing cable 42 causes the bell crank 40 to rotate in a counterclockwise direction. The counterclockwise rotation of the crank 40 extends the lip connecting link 44, the lip arm 38c and the lip 38 from the pendant position shown in FIG. 2 to the extended position in FIG. 3. In order to extend the lip 38, it is desirable that the snubbing cable 42 provide the maximum torque on the crank 40 at the pendant position. Thus, the anchor end 42a of the snubbing cable 42 is preferably positioned so that the force of the cable (moment arm BG in the illustrated embodiment) is substantially perpendicular to the crank arm AB thereby maximizing the torque created by snubbing cable 42 on the crank 40. It is also preferable that the biasing force generated by the biasing means in the pendant position be nearly in line with the crank arm AD so that any clockwise torque generated by the biasing means is minimized. After the biasing force of the biasing means is rotated over-center, the biasing means creates a counterclockwise torque which will assist the extension of the lip 38. In the extended position, the biasing means and the snubbing force from cable 42 will maintain the lip 38 in the extended position until the operator lowers the ramp 16 to engage the bed of the vehicle or to be stored.

As the ramp 16 is lowered to permit the lip 38 to engage the bed of the vehicle, it will be appreciated that the force and torque exerted on the crank 40 by the snubbing cable 42 is terminated. At this point, the weight of the lip 38 transmits a clockwise torque through the connecting link 44 to crank 40 great enough to initiate clockwise rotation of crank 40.

In accordance with one of the objects of the invention, the pivot controlling means controls the downward rotation of the lip 38 so that it is relatively slow during the first portion of the lip descent and relatively rapid during the latter portion of the lip descent. In order to slow the descent of the lip 38, the pivot controlling means maximizes the counterclockwise torque created by the biasing means and minimizes the clockwise torque created by the lip 38. The counterclockwise torque generated by the biasing means, aided by damper 48, is sufficient to counteract the clockwise torque generated by the weight of the lip 38 and slow the downward descent of the lip 38. In order to maximize the counterclockwise torque of the biasing means resisting the downward rotation of the lip 38, it is preferable that the biasing force created by the biasing means be substantially perpendicular to crank arm AD as shown in FIG. 3. Similarly, it is preferable that the force exerted on the crank 40 by the lip 38 (moment arm CE in FIG. 3) be minimized near the extended position. Thus, it is preferable that during initial descent the lip force (moment arm CE in FIG. 3) be nearly in line with the crank arm AC so that the torque generated by the lip 38 is minimized.

In order to facilitate the downwardly rotation of the lip 38 during the latter portion of the lip descent, the pivot controlling means progressively minimizes the counterclockwise torques while increasing the clockwise torques. The torque created by the lip 38 will progressively increase as the direction of the force applied through link 44 becomes closer to perpendicular to crank arm. The torque generated by the biasing means decreases as the biasing force moves from a perpendicular orientation at the extended position to a nearly in- line orientation at the pendant position even though the biasing force of the spring 46 increases as the crank 40 rotates from the extended to the pendant position. Furthermore, the counterclockwise torque created by the biasing means which resists the downward descent of the lip 38 will change to a clockwise torque facilitating the retraction of the lip 38 below the intermediate point (in which the point D moves over center where the biasing force of the biasing means is in line with the crank arm AD shown in FIG. 4).

In accordance with one of the objects of the invention, the lip extension and control assembly provides means for selectively adjusting the rate of downward rotation of the lip and means for selectively adjusting the extension force for extending the lip. The rate of downward rotation may be selectively varied by the adjustment nut 47b which varies the moment arms and, thus, the torques exerted on the crank 40 by the lip and the biasing means. Tightening the nut 47b limits the rotation of the crank 40 in the counterclockwise direction during the lip extension which effectively increases moment arm CE and decreases the length DF thereby increasing the resulting clockwise torque and the downward lip rotation. Conversely, loosening the nut 47b increases the arm DF and decreases the moment arm CE, allowing points A, C and E to approach, without achieving, a colinear orientation, or toggle position, which decreases the resulting clockwise torque thereby slowing the downward lip rotation. It will be appreciated that it is undesirable to adjust nut 47b so loose as to allow points A, C and E to become colinear in a toggle position, as this would cause the lip 38 to become locked. Thus, the adjustment nut 47b permits the programmed rate of descent to be adjusted independently of the extension force created by the spring and the snubbing cable. The rate of rotation of the lip 38 can also be varied by adjusting the tension in the spring 46 with the nut 47. Increasing the compression of the spring 46 will increase the counterclockwise torque created by the biasing means thereby slowing the lip descent and increasing the lip extension torque of the biasing means. In addition, the nuts 47 and 47b permit the biasing means to be selectively adjusted to accommodate for the different lip sizes and frictional characteristics in the assembly which may be found in different dock levelers. It will also be appreciated that in contrast to many conventional dock levelers in which the lip extension force increases from the extended to the pendant positions, the pivot controlling means minimizes the spring force needed to maintain the lip in the extended position by maximizing the moment arm between the spring 46 and the crank 40. Similarly, the pivot controlling means minimizes the snubbing cable force needed to extend the lip thereby permitting a lighter main spring 26 adjustment. Thus, an operator requires less walk down force to lower the lip 38 and the ramp 16.

In accordance with another object of the invention, the lip extension and control assembly 10 utilizes a yieldable connecting link 44 between the crank 40 and lip 38 to allow over-extension of the lip 38 in the event that an extremely heavy load is driven over the ramp 16. The yieldable connecting link 44 also compensates for wear in the lip crown and the ramp 16 and size differences in different dock levelers. Referring to FIG. 5, the connecting link 44 comprises two U-brackets 52a, 52b, one at each end, a rigid cylindrical tube 54 rigidly attached to U-bracket 52a and disc 54a, a bolt 58 rigidly attached to U-bracket 52b, and slidably disposed in the tube 54 and a spring 56 compressed between the bolt head and disc 54a and preferably disposed inside the tube 54. In order to extend the lip 38, the tube 54 permits the extension force to be transmitted from the snubbing cable 42 and the crank 40 to the lip 38. It will be appreciated that the spring 56 permits the lip 38 to be extended beyond its maximum adjusted crank position without damage thereto.

I claim as my invention:

1. A lip extension and control assembly for use in a dock leveler system wherein the dock leveler system is provided with a frame mounted to a loading dock, a ramp having a free front edge and a rear edge pivotally attached to the frame, and lifting means for moving the ramp between a stored position, a preparatory position, and an operative position for loading and unloading a vehicle, and a lip having a first portion pivotally connected to the ramp for pivoting between a pendant position and an extended position and a second portion adapted for engaging the vehicle in the operative position, wherein the lip extension and control assembly comprises a lip control assembly operatively connected to the lip for automatically extending the lip from the pendant position to the extended position in response to the upward rotation of the ramp and for automatically rotating the lip from the extended position toward the pendant position after the lip is rotated to the extended position while selectively and controllably adjusting the downward rate of rotation of the lip to increase as it approaches the pendant position after the lip is released from the extended position.

2. The assembly as set forth in claim 1 wherein the lip control assembly maintains the lip in the extended position in the preparatory position.

3. The assembly as set forth in claim 1 wherein the lip control assembly comprises a first assembly for extending the lip, wherein the first assembly selectively controls a first force for extending the lip while reducing a second force generated by the lifting means for extending the ramp and applied to the assembly for extending the lip.

4. The assembly as set forth in claim 3 wherein the lip control assembly comprises a second assembly for controlling the initial rate of downward rotation of the lip from the extended position independently from the first assembly.

5. The assembly as set forth in claim 1 wherein the lip control assembly comprises a biasing assembly operatively connected to the lip for exerting a biasing force on the lip, and wherein the biasing assembly is adjustable for selectively controlling the biasing force to control the lip rotation independently of the extension assembly.

6. The assembly as set forth in claim 5 wherein the biasing assembly is adapted to first resist the downward rotation of the lip and then assist the downward rotation of the lip.

7. The assembly as set forth in claim 6 comprising a crank pivotally connected to the ramp having a first point connected to the biasing assembly and a second point operatively connected to the lip for transferring forces between the lip and the biasing assembly.

8. The assembly as set forth in claim 7 wherein the crank has a third point connected to the extension assembly for urging the lip to rotate from the pendant position to the extended position in response to the upward rotation of the ramp to the preparatory position.

9. The assembly as set forth in claim 1 wherein the lip control assembly comprises a linkage for permitting the lip to yieldably extend in the upward direction in response to a lifting force exerted on the lip.

10. The assembly as set forth in claim 7 comprising: a link connecting the lip and the second point of the crank for rotating the lip in response to the lip control assembly.

11. The assembly as set forth in claim 10 wherein the link comprises a first member for preventing the link from being compressed in response to the compression forces exerted by the lip and the crank and a second member for permitting the link to yieldably extend in response to extension forces exerted by the lip and the crank.

12. The assembly as set forth in claim 1 wherein the lip control assembly progressively increases the downward rate of rotation of the lip.

13. A dock leveler assembly for carrying traffic between a dock and a vehicle parked adjacent to the dock comprising:
a support frame;
a ramp pivotally connected to the support frame and having a front edge;
lifting means operatively connected to the ramp means for moving the ramp between a stored position, a preparatory position, and an operative position;
a lip pivotally connected to the front edge for pivoting between a pendant position and an extended position for engaging the vehicle; and
a lip extension and control assembly operatively connected to the lip for automatically extending the lip from the pendant position to the extended position in response to the upward rotation of the ramp, and for automatically rotating the lip from the extended position toward the pendant position after the lip is rotated to the extended position while selectively and controllably adjusting the downward rate of rotation of the lip to increase as it approaches the pendant position after the lip is released from the extended position.

14. The assembly as set forth in claim 13 wherein the lip extension and control assembly extends the lip so as to permit the reduction of a lifting force generated by the lifting means for extending the ramp.

15. The assembly as set forth in claim 13 wherein the lip extension and control assembly progressively increases the downward rate of rotation of the lip.

16. The assembly as set forth in claim 13 wherein the lip extension and control assembly initially acts to controllably resist the descent of the lip and then acts to assist the descent of the lip.

17. The assembly as set forth in claim 13 wherein the lip extension and control assembly controls the initial downward rate of rotation of the lip and then controls the rate of rotation of the lip at an increased rate thereafter.

18. The assembly as set forth in claim 13 wherein the lip extension and control assembly maintains the lip in the extended position in the preparatory position.

19. The assembly as set forth in claim 13 wherein the lip extension and control assembly comprises an extension assembly operatively attached to the lip so as to rotate the lip to the extended position in response to the upward rotation of the ramp by the lifting means.

20. The assembly as set forth in claim 19 wherein the extension assembly maintains the lip in the extended position in the preparatory position.

21. The assembly as set forth in claim 19 wherein the extension assembly comprises a first extension assembly operatively attached to the lip for raising the lip to extended position in response to the raising of the ramp by the lifting means.

22. The assembly as set forth in claim 21 wherein the extension assembly comprises a biasing assembly operatively attached to the lip which is adapted to assist the first extension assembly to raise the lip.

23. The assembly as set forth in claim 22 wherein the biasing assembly is adapted to assist in raising the lip independently of the lifting means.

24. The assembly as set forth in claim 22 wherein the first extension assembly comprises a snubbing cable operatively attached to the lip so as to rotate the lip to the extended position in response to the upward rotation of the ramp and the biasing assembly is operatively connected to the lip and is adapted to assist rotation the lip to the extended position independently of the lifting means.

25. The assembly as set forth in claim 22 wherein the biasing assembly selectively controls a first force for extending the lip to permit the reduction of a lifting force generated by the lifting means for extending the ramp as applied to the extension assembly.

26. The assembly as set forth in claim 22 wherein the biasing means comprises an adjustment assembly for selectively controlling the biasing force to control the lip rotation independently of the first extension assembly.

27. The assembly as set forth in claim 13 wherein the lip extension and control assembly comprises a pivot controlling assembly operatively connected to the lip for automatically rotating the lip from the extended position toward the pendant position after the lip is rotated to the extended position while selectively and controllably adjusting the downward rate of rotation of the lip to increase as it approaches the pendant position after the lip is released from the extended position.

28. The assembly as set forth in claim 27 wherein the pivot controlling assembly progressively increases the downward rate of rotation of the lip.

29. The assembly as set forth in claim 27 wherein the pivot controlling assembly initially acts to controllably resist the descent of the lip and then acts to controllably assists the descent of the lip.

30. The assembly as set forth in claim 27 wherein the pivot controlling assembly controls the initial downward rate of rotation of the lip and then controls the rate of rotation of the lip at an increased rate thereafter.

31. The assembly as set forth in claim 27 wherein the pivot controlling assembly comprises a biasing assembly operatively connected to the lip for exerting a biasing force on the lip.

32. The assembly as set forth in claim 31 wherein the biasing force first acts to controllably resist the descent of the lip and then acts to controllably assist the descent of the lip.

33. The assembly as set forth in claim 27 wherein the pivot controlling assembly comprises a first pivot controlling assembly which resists the downward rotation of the lip.

34. The assembly as set forth in claim 33 wherein the first pivot controlling assembly controls the initial downward rate of rotation of the lip and but does not affect the rate of rotation of the lip thereafter.

35. The assembly as set forth in claim 33 wherein the pivot controlling assembly comprises a biasing means operatively connected to the lip which generates a force which first acts to controllably resist the descent of the lip and then acts to controllably assist the descent of the lip.

36. The assembly as set forth in claim 35 wherein the biasing assembly is adapted to resist the downward rotation of the lip independently of the first pivot controlling means.

37. The assembly as set forth in claim 22 wherein the lip extension and control assembly comprises a biasing assembly operatively connected to the lip which generates a force which assists the rotation of the lip towards the extended position when the ramp is being raised and which selectively and controllably adjusts the downward rate of rotation of the lip to increase as the lip approaches the pendant position after the lip is released from the extended position.

38. The assembly as set forth in claim 37 wherein the biasing assembly progressively increases the downward rate of rotation of the lip.

39. The assembly as set forth in claim 37 wherein the biasing assembly initially acts to controllably resist the descent of the lip and then acts to controllably assist the descent of the lip.

40. The assembly as set forth in claim 37 wherein the biasing assembly comprises an adjustment assembly for selectively controlling the biasing force independently of the first extension assembly.

41. The assembly as set forth in claim 37 wherein the biasing assembly controls the initial downward rate of rotation of the lip and then controls the rate of rotation of the lip at an increased rate thereafter.

42. The assembly as set forth in claim 37 wherein the biasing assembly is adapted to assist in raising the lip independently of the lifting means.

43. The assembly as set forth in claim 37 wherein the lip extension and control assembly comprises a first pivot controlling assembly which resists the downward rotation of the lip.

44. The assembly as set forth in claim 43 wherein the biasing assembly resists the downward rotation of the lip independently of the first pivot controlling assembly.

45. The assembly as set forth in claim 43 wherein the biasing assembly comprises an adjustment assembly for selectively controlling the biasing force independently of the first pivot controlling assembly.

46. The assembly as set forth in claim 13 wherein the lip extension and control assembly comprises a crank operatively connected to the lip for transferring forces to the lip,
  a first extension assembly operatively attached to the crank lip for raising the lip to extended position in response to the raising of the ramp by the lifting means, and
  a biasing assembly operatively attached to the crank which is adapted to selectively and controllably adjust the downward rate of rotation of the lip to increase as the lip approaches the pendant position after the lip is released from the extended position.

47. The assembly as set forth in claim 46 comprising an adjustment assembly to allow the lip to approach a toggle position in which the lip will not fall.

48. The assembly as set forth in claim 46 wherein the biasing assembly is adapted to assist the first extension assembly to raise the lip.

49. The assembly as set forth in claim 46 wherein the biasing assembly progressively increases the downward rate of rotation of the lip.

50. The assembly as set forth in claim 46 wherein the biasing assembly initially acts to controllably resist the descent of the lip and then acts to controllably assist the descent of the lip.

51. The assembly as set forth in claim 46 wherein the biasing assembly controls the initial downward rate of rotation of the lip and then controls the rate of rotation of the lip at an increased rate thereafter.

52. The assembly as set forth in claim 46 wherein the first extension assembly maintains the lip in the extended position in the preparatory position.

53. The assembly as set forth in claim 46 wherein the biasing assembly comprises an adjustment assembly for selectively controlling the biasing force to control the lip rotation independently of the first extension assembly.

54. The assembly as set forth in claim 46 wherein the lip extension and control assembly comprises a first pivot controlling assembly operatively connected to the crank for controlling the initial rate of downward rotation of the lip from the extended position independently from the biasing assembly.

55. The assembly as set forth in claim 54 wherein the first pivot controlling assembly comprises a damper operatively attached to the crank for resisting the downward movement of the lip.

56. The assembly as set forth in claim 46 wherein the crank is operatively connected to the biasing assembly such that the moment arm of the biasing assembly on the crank increases as the lip rotates from the pendant to the extended position.

57. The assembly as set forth in claim 46 wherein the moment arm of the biasing assembly on the crank decreases and then increases as the lip rotates from the extended position to the pendant position.

58. The assembly as set forth in claim 46 wherein the crank is operatively connected to the first extension assembly such that the moment arm of the first extension assembly on the crank decreases as the lip rotates from the pendant to the extended position.

59. The assembly as set forth in claim 46 wherein the crank is operatively connected to the pivot controlling assembly such that the moment arm of the pivot controlling assembly on the crank increases as the lip rotates from the pendant to the extended position.

60. The assembly as set forth in claim 46 comprising a link operatively connecting the lip and the crank for rotating the lip in response to the forces exerted on the crank.

61. The assembly as set forth in claim 60 wherein the link is adapted to resist compression in response to the compression forces exerted by the lip on the crank and to permit the link to yieldably extend in response to extension forces exerted by the lip and the crank.

62. The assembly as set forth in claim 61 wherein the link comprises a rigid member which resists compression of the link and a resilient member which permits extension of the link.

63. The assembly as set forth in claim 46 comprising a link assembly for permitting the lip to yieldably extend in the upward direction in response to a compression force exerted thereon.

64. A method for extending and controlling a lip used in a dock leveler for carrying traffic between a dock and a vehicle parked adjacent to the dock, the dock leveler having a support frame, a ramp pivotally connected to the support frame and having a front edge, lifting means operatively connected to the ramp for lifting the ramp between inoperative and operative positions, the lip pivotally connected to the front edge for pivoting between a pendant position in the inoperative position and an extended position for engaging the vehicle in the operative position, an extension assembly operatively connected to the lip for extending the lip from the pendant position to the extended position in response to the upward rotation of the ramp, and a pivot controlling assembly operatively connected to the lip for automatically controlling the rate of rotation of the lip; the method comprising:
 raising the ramp to the operative position;
 extending the lip to the extended position;
 lowering the ramp and the extended lip to engage the vehicle; and
 selectively and controllably adjusting the downward rotation of the lip with said pivot controlling assembly so that the rate of rotation of the lip automatically increases in a programmed manner from the extended position as the lip approaches the pendant position.

65. A lip extension and control assembly for use in a dock leveler system having a frame for mounting to a loading dock for vehicles, a ramp having a free front portion and a rear portion hingedly attached to the frame, and lifting means for moving the ramp between a stored position, a preparatory position and an operative position for loading and unloading a vehicle, the lip extension and control assembly comprising:
 a lip having a first edge connected to the ramp front portion for movement between a pendant position for the stored ramp position, an extended position for said preparatory ramp position, and an operative position for said operative ramp position for operative engagement with a vehicle;
 an extension assembly operatively connected to the lip for extending the lip to the extended position in response to rotation of the ramp to the preparatory position; and
 a pivot controlling assembly operatively connected to the lip to control the initial downward rate of rotation of the lip as the ramp moves from the preparatory position toward the operative position and to selectively control the rotation of the lip at an increased rate thereafter.

66. A lip extension and control assembly for use in a dock leveler system wherein the dock leveler system is provided with a frame mounted to a loading dock, a ramp having a free front edge and a rear edge pivotally attached to the frame, and lifting means for moving the ramp between a stored position, a preparatory position, and an operative position for loading and unloading a vehicle, and a lip having a first portion pivotally connected to the ramp for pivoting between a pendant position and an extended position and a second portion adapted for engaging the vehicle in the operative position,
 wherein the lip extension and control assembly comprises a lip control assembly operatively connected to the lip for automatically extending the lip from the pendant position to the extended position in response to the upward rotation of the ramp and for automatically rotating the lip from the extended position toward the pendant position after the lip is rotated to the extended position while selectively and controllably increasing the downward rate of rotation of the lip from the extended position to the pendant position after the lip is released from the extended position, and
 wherein the lip control assembly comprises a biasing assembly operatively connected to the lip by a crank such that the moment arm of the biasing assembly on the crank increases as the lip rotates from the pendant position to the extended position.

67. A lip extension and control assembly for use in a dock leveler system wherein the dock leveler system is provided with a frame mounted to a loading dock, a ramp having a free front edge and a rear edge pivotally attached to the frame, and lifting means for moving the ramp between a stored position, a preparatory position, and an operative position for loading and unloading a vehicle, and a lip having a first portion pivotally connected to the ramp for pivoting between a pendant position and an extended position and a second portion adapted for engaging the vehicle in the operative position,
 wherein the lip extension and control assembly comprises a position adjustment assembly to allow the orientation of the lip extension and control assembly to be selectively adjusted to approach, without achieving, a toggle position as the lip approaches the extended position.

68. A lip extension and control assembly for use in a dock leveler system wherein the dock leveler system is provided with a frame mounted to a loading dock, a ramp having a free front edge and a rear edge pivotally attached to the frame, and lifting means for moving the ramp between a stored position, a preparatory position, and an operative position for loading and unloading a vehicle, the lip extension and control assembly comprising:
 a lip having a first portion pivotally connected to the ramp for pivoting between a pendant position and an extended position and a second portion adapted for engaging the vehicle in the operative position,
 an extension assembly operatively connected to the lip for automatically extending the lip from the pendant position to the extended position in response to the upward rotation of the ramp, and a pivot controlling assembly operatively connected to the lip for automatically rotating the lip from the extended position toward the pendant position for selectively increasing the downward rate of rotation of the lip from the extended position to the pendant position wherein the pivot controlling assembly has a biasing assembly operatively connected to the lip and adapted to first resist the downward rotation of the lip and then assist the downward rotation of the lip.

69. The assembly as set forth in claim 68 wherein the biasing assembly is adjustable for selectively controlling the biasing force to control the lip rotation independently of the extension assembly.

70. The assembly as set forth in claim 68 comprising a crank pivotally connected to the leveler having a first point connected to the biasing assembly and a second point operatively connected to the lip for transferring forces between the lip and the biasing assembly.

71. The assembly as set forth in claim 70 wherein the crank has a third point connected to the extension assembly for urging the lip to rotate from the pendant position to the extended position in response to the upward rotation of the ramp to the preparatory position.

72. The assembly as set forth in claim 70 comprising:
a link connecting the lip and the second point of the crank for rotating the lip in response to the extension assembly.

73. The assembly as set forth in claim 72 wherein the link comprises a first member for preventing the link from being compressed in response to the compression forces exerted by the lip and the crank and a second member for permitting the link to yieldably extend in response to extension forces exerted by the lip and the crank.

* * * * *

UNITED STATES PATENT AND TRADEMARK OFFICE
CERTIFICATE OF CORRECTION

PATENT NO. : 5,323,503
DATED : JUNE 28, 1994
INVENTOR(S) : SCOTT SPRINGER

It is certified that error appears in the above-indentified patent and that said Letters Patent is hereby corrected as shown below:

ON THE TITLE PAGE:

[56] References Cited

U.S. Patent Documents

Column 2, line 2, delete "4,110,960" and substitute therefor -- 4,110,860 --.

Column 5, line 53, delete "444" and substitute therefor -- 44 --.

Column 13, lines 45-46, delete "from the extended position".

Signed and Sealed this

Fifteenth Day of November, 1994

Attest:

BRUCE LEHMAN

*Attesting Officer*   *Commissioner of Patents and Trademarks*